May 21, 1929.　　　W. A. TYLER ET AL　　　1,714,331
FILTER PRESS
Filed March 25, 1927　　2 Sheets-Sheet 1
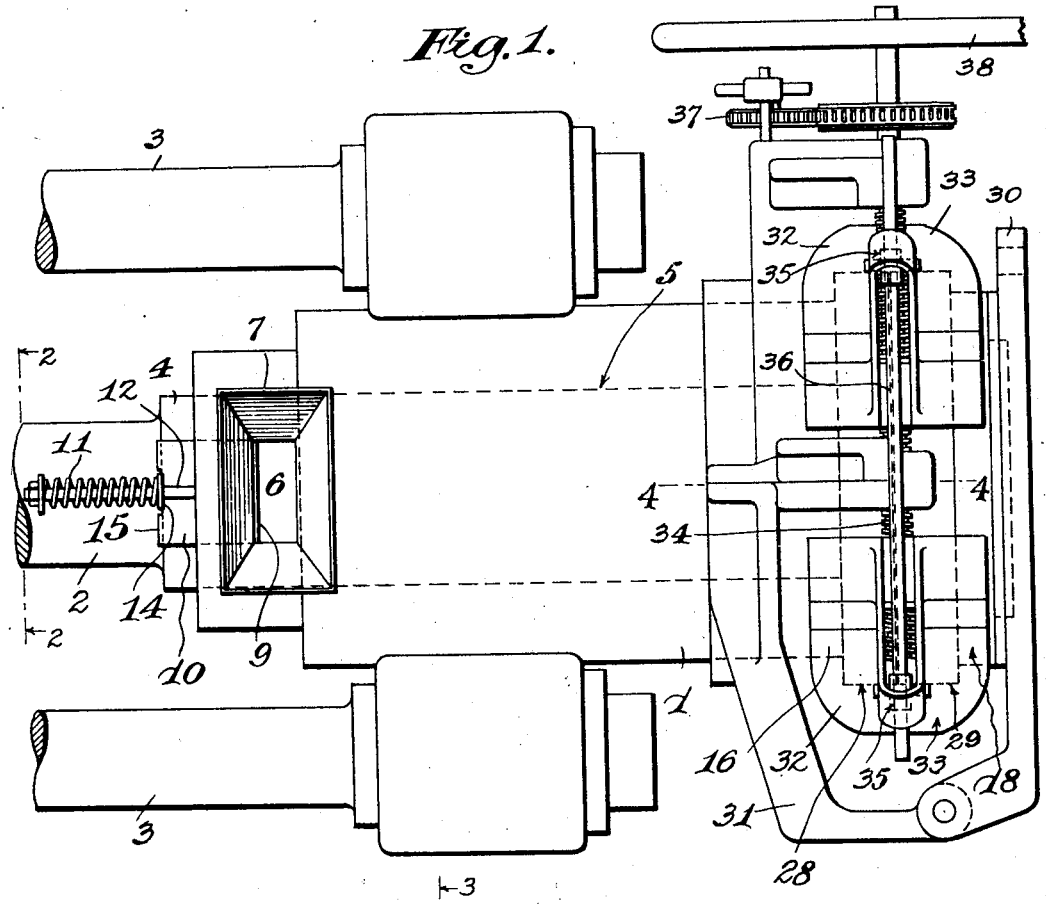
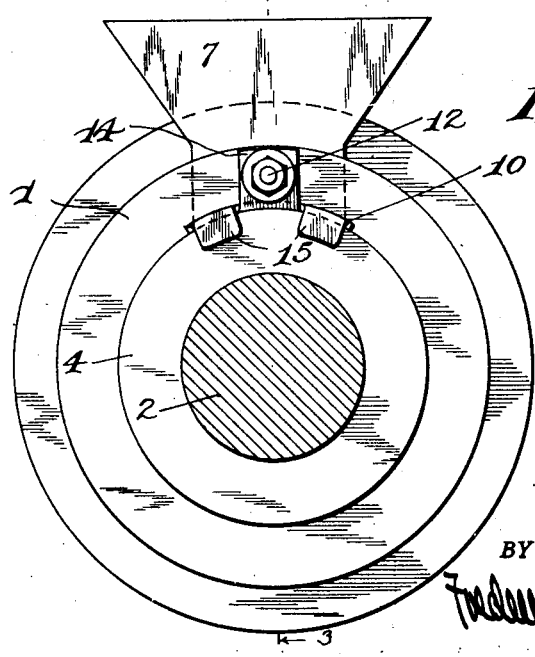
INVENTORS:
Raymond Stark
Walter A. Tyler
BY
　　　　ATTORNEY May 21, 1929.    W. A. TYLER ET AL    1,714,331
FILTER PRESS
Filed March 25, 1927    2 Sheets-Sheet 2
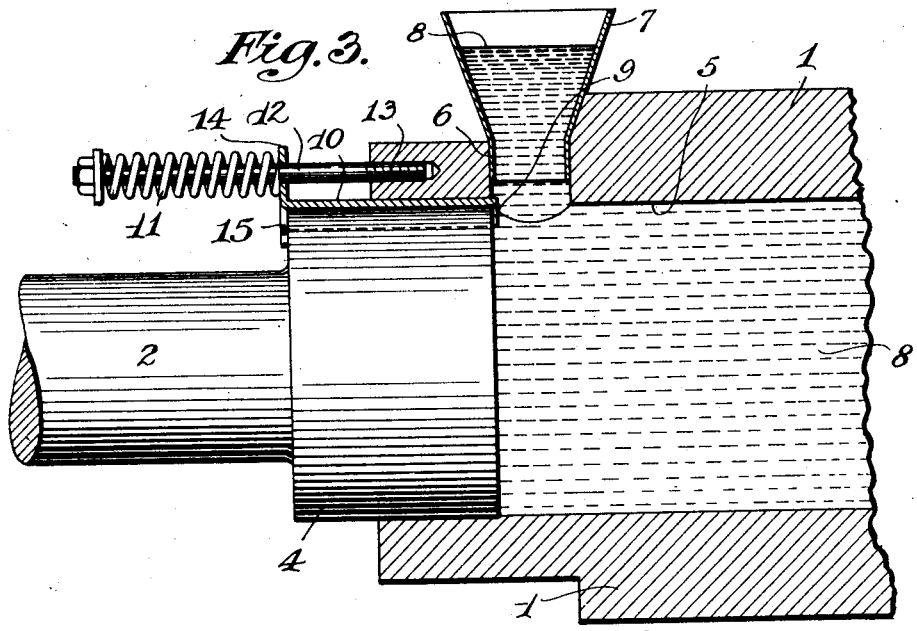
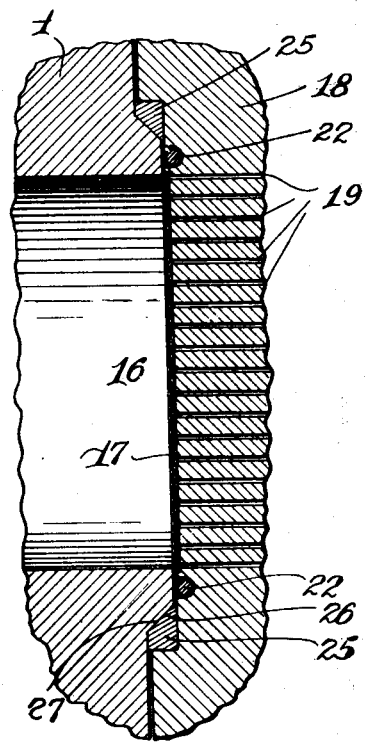
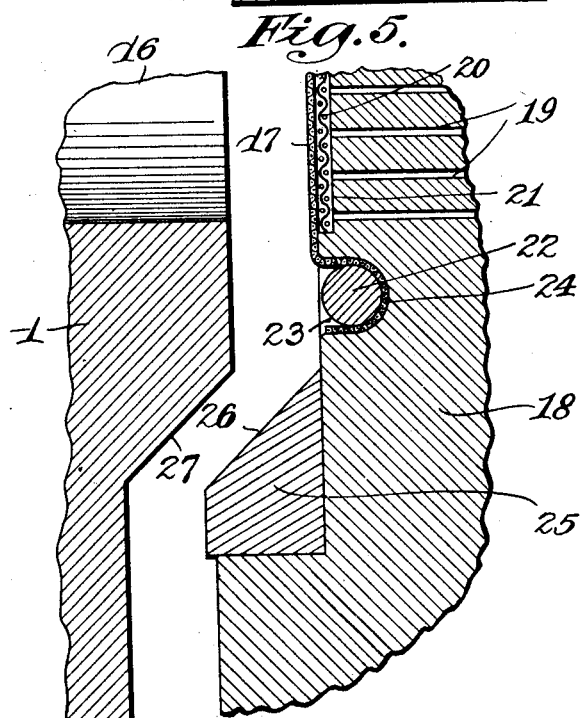
INVENTORS:
Raymond Stark
Walter A. Tyler
BY Frederick S. Duncan, ATTORNEY Patented May 21, 1929.

1,714,331

UNITED STATES PATENT OFFICE.

WALTER A. TYLER, OF BROOKLYN, AND RAYMOND STARK, OF STAPLETON, NEW YORK, ASSIGNORS TO L. A. DREYFUS COMPANY, A CORPORATION OF NEW YORK.

FILTER PRESS.

Application filed March 25, 1927. Serial No. 178,285.

This invention relates to improvements in hydraulic filter presses and is of particular utility when embodied in a press for filtering chewing gum base, although we contemplate the utilization of our improvements in any field for which they may be adapted by their nature.

Chewing gum base in its natural or compound state contains a variety of impurities. The most objectionable of these are particles of bark, sand, and grit. Before being made up into finished gum, this foreign matter must be removed. The base is firm and semi-plastic at room temperature and with the application of heat becomes soft and semi-liquid, having a consistency about that of molasses and being very sticky. The problem in cleaning is to pass the melted mass through a suitable filtering medium and remove the foreign matter.

The usual procedure is to melt the base and force it by air pressure through a multiple filter medium such as sawdust against cloth. This method is slow, because any variation in the quality or viscosity of the base will retard the rate of filtration.

An important object of the present invention is to provide a filter press in which by the use of hydraulic pressure, the rate of filtration may be controlled; the pressures used may be greatly in excess of those to which conventional machines are limited; and a much higher rate of filtration may be attained, yielding a production increased over 100%.

Another object of the invention is to provide for using a simpler form of filtering medium, comprising a single filter cloth, and to hold this cloth against a filter die in such a manner that the cloth will not be torn under the high pressures used, and accordingly the material will be prevented from leaking at the region where the cloth is clamped.

A cognate object of the invention is to provide a metal to metal seal at the joint between the die and the head of the cylinder in which the filtering pressure is exerted, this being independent of the clamping action by which the cloth in maintained in its operative position.

Still another object of the invention is to provide convenient charging means for introducing material into the press at the proper region to permit proper action thereon by the plunger of the press.

The various features of the invention will be illustrated and described fully in the accompanying drawings and specification and pointed out in the claims.

In the drawings:

Fig. 1 is a view in plan of a sufficient portion of a filter press to permit the invention to be understood.

Fig. 2 is a vertical section on the line 2—2 of Fig. 1, parts being omitted.

Fig. 3 is a vertical longitudinal section on the line 3—3 of Fig. 2.

Fig. 4 is a fragmentary detail view in vertical section of the joint between the filter die and the adjacent end of the pressure cylinder, showing the means for clamping a filter cloth in its operative position, this view being taken on the line 4—4 of Fig. 1.

Fig. 5 is a fragmentary detailed view on a still larger scale of the clamping ring and its associated parts, showing the cloth in position ready for the die to be closed against the cylinder head.

In the illustrated embodiment, the part designated by the reference numeral 1 is the pressure cylinder of a hydraulic press, which may be of any suitable general structure and is herein shown as provided with a plunger 2, and as having the usual strengthening rods 3 connecting the cylinder 1 with the other parts of the press in which the hydraulic pressure is applied to the plunger 2, such parts being preferably of well known or suitable construction and not requiring illustration herein.

As shown in Fig. 3 the plunger 2 is provided with a piston 4 fitting the inner bore 5 of the cylinder 1, and in accordance with an important feature of the invention we have provided at 6 a charging aperture preferably having a funnel 7 through which may be introduced the material to be filtered, indicated by the reference numeral 8, and which may be the semi-plastic chewing gum base or any material which may be filtered to advantage in such a press.

Where the material is of the semi-plastic nature already described and quite viscous, we find it desirable to provide special means for cutting off the port 9 below the funnel 7, and as a now preferred means for accomplishing this purpose we have devised an appliance comprising a slide 10, fitted around a portion of the periphery of the piston 4, and having means to cause it to follow the piston in its operative movement, such means preferably acting yieldingly, in order to permit the slide or closure 10 to lag somewhat until the piston has passed beyond the port 9.

As a convenient device for the above purpose we have shown a spring 11 coiled upon a rod 12 screwed at 13 into the end of the cylinder 1, the spring bearing against an upward projection 14 formed at the end of the closure 10. The closure has a downward projection or projections 15 which stand behind the head of the piston, and thus when the piston is retracted, the closure 10 is automatically retracted with it.

In pursuance of another important object of the invention, we have provided a novel filter medium, and improved means for clamping the filter medium in its operative position upon the filter die, at the outlet end 16 of the cylinder 1.

In accordance with this invention the filter medium preferably takes the form of a single cloth 17 of suitable textile fabric, preferably circular in shape and stretched across the filter die, which in Fig. 5 and the other figures is designated by the numeral 18, having suitable outlets 19 through which the filtrate may pass after having been pressed through the cloth 17 by the action of the piston 4 already described.

Preferably a wire gauze 20 will be provided within a suitable recess 21 in the face of the die 18 to afford a certain amount of support to the cloth 17.

The filter die may be of any suitable shape, and in Fig. 1 the die 18 is indicated as of circular form, having a peripheral flange 29 adapted to abut against a similar flange 28 at the end of the material cylinder 1, the die being mounted, for convenience in emplacement and removal, upon a swinging carrier 30, pivoted upon a bracket 31 extending from the cylinder 1.

When the die is in its operative position, as shown in Fig. 1, it is preferably held to the cylinder end by suitable clamps having parts 32 and 33 which embrace the flanges 28 and 29. These clamps are supported by rollers 35, running on an overhead track 36, and are adapted to be actuated by a worm 34 operated by suitable gearing 37 and a hand wheel 38.

As the now preferred means for holding the filter cloth 17 firmly in its operative position between the filter die 18 and cylinder end 16, in pursuance of our invention, we have provided a metal ring 22 which is seated in a groove 23 formed in the face of the die outside the area occupied by the outlets 19, and the outer margin 24 of the filter cloth is wedged into the groove 23 and there held by the ring 22, the diameter of the ring being suitable to prevent its escape when the die shall have been closed into the position shown in Fig. 4. This ring is preferably a continuous ring.

In accordance with another very important object of the invention we have devised a novel metal to metal seal to complete the joint between the die 18 and the end 16 of the material cylinder, the seal preferably being annular in shape, and occupying a position surrounding the ring 22, as closely thereto as may be found practical in constructing the press. Any suitable metal may be used for this seal but we prefer the use of copper rather than a metal as soft as lead or a seal of non-metallic material such as hard rubber.

The now preferred form of this seal is shown at 25, comprising a ring of copper of trapezoidal cross section, presenting a bevelled surface 26, annularly disposed and adapted to cooperate with a similarly bevelled surface 27 formed at the head of the steel cylinder 1.

When the die 18 is brought into the position shown in Fig. 4, it is clear that the annulus 25 affords a metal seal, which is independent of the ring 22 and supported cloth 17. This structure insures a complete sealing of the annular region surrounding the filter cloth 17.

The total pressure in the material cylinder may vary from 300 pounds per square inch to 3,000 pounds per square inch, depending on filtering conditions. The total pressure exerted against the die tending to cause deflection may run as high as 340,000 pounds, which would result in blowing out the cloth, in structures not provided with our improvements.

With the single filter cloth 17, the rate of filtration with our improved press has reached 560 pounds per hour as against 238 pounds per hour in machines of the air pressure type employing cloth and saw-dust, in which conventional machines the pressures rarely can exceed 250 pounds per square inch.

We claim:

1. In a filter press, a material cylinder, a filter die, means to secure said filter die removably to one end of said cylinder, and a filter cloth between said filter die and cylinder end, said die having a groove surrounding the filter area of said die, to receive said cloth, and a ring engaged with said cloth in said groove and prevented from escape by the adjacent face of said cylinder end, said cylinder end and die having bevelled co-operating portions to form a seal outside the region occupied by said ring.

2. A filter press having a material cylinder and a plunger operating therein, a filter die and means to secure said die removably to one end of said cylinder, and an annulus between said die and cylinder end, said annulus and cylinder end having co-operating bevelled surfaces acting as a seal for the joint between said die and cylinder end.

3. A filter press having a material cylinder and a plunger operating therein, a filter die and means to secure said die removably to one end of said cylinder, and a metal annulus between said die and cylinder end, said annulus and cylinder end having co-operating bevelled surfaces acting as a seal for the joint between said die and cylinder end.

4. A filter press having a material cylinder and a plunger operating therein, a filter die and means to secure said die removably to one end of said cylinder, and a copper annulus between said die and cylinder end, said annulus and cylinder end having co-operating bevelled surfaces acting as a seal for the joint between said die and cylinder end.

In testimony whereof we have signed this specification.

WALTER A. TYLER.
RAYMOND STARK.